United States Patent
Scott et al.

(10) Patent No.: US 10,713,735 B2
(45) Date of Patent: Jul. 14, 2020

(54) IDENTIFYING AND RECOMMENDING POTENTIAL BENEFITS

(71) Applicant: HRB Innovations, Inc., Las Vegas, NV (US)

(72) Inventors: Laurie Croslin Scott, Kansas City, MO (US); Joseph Bartling, Overland Park, KS (US); Gil Charney, Overland Park, KS (US); C. Taylor Brown, Cleveland, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 376 days.

(21) Appl. No.: 15/496,876

(22) Filed: Apr. 25, 2017

(65) Prior Publication Data

US 2018/0060972 A1    Mar. 1, 2018

Related U.S. Application Data

(60) Provisional application No. 62/380,100, filed on Aug. 26, 2016.

(51) Int. Cl.
*G06Q 40/00* (2012.01)
*G06F 16/00* (2019.01)
*G06F 16/13* (2019.01)

(52) U.S. Cl.
CPC ........... *G06Q 40/123* (2013.12); *G06Q 40/10* (2013.01); *G06F 16/00* (2019.01); *G06F 16/13* (2019.01)

(58) Field of Classification Search
CPC ........ G06Q 10/00; G06Q 20/00; G06Q 30/00; G06Q 40/00

(Continued)

(56) References Cited

U.S. PATENT DOCUMENTS

| 7,539,635 B1 * | 5/2009 | Peak | G06Q 10/00 |
| | | | 705/31 |
| 7,627,504 B2 * | 12/2009 | Brady | G06Q 40/00 |
| | | | 705/1.1 |

(Continued)

OTHER PUBLICATIONS

Macey, "The Future of Employee Benefits: A Call for Reform", Benefits Law Journal, vol. 15, No. 2, Summer (Year: 2002).*

(Continued)

*Primary Examiner* — Frantzy Poinvil
(74) *Attorney, Agent, or Firm* — Erise IP, P.A.

(57) ABSTRACT

Potential benefits that may be applicable to a taxpayer are identified based upon other tax returns for other similar taxpayers, specifically based upon a common external entity that may provide or be associated with the benefit. Identified potential benefits are then recommended to the user. Steps may include receiving a set of taxpayer information related, at least in part, to a subject tax return of the subject taxpayer; identifying an external entity identified on the subject tax return; analyzing a filed return data store to determine benefits reported on tax returns that are indicative of the external entity; identifying a potential benefit associated with the external entity; determining an estimated criterion for the potential benefit; determining whether the subject taxpayer is likely eligible for the potential benefit, based upon the estimated criterion and the set of taxpayer information; and recommending the potential benefit to the subject taxpayer.

15 Claims, 4 Drawing Sheets

(58) Field of Classification Search
USPC .......................................................... 705/3–44
See application file for complete search history.

(56) References Cited

U.S. PATENT DOCUMENTS

| | | | | |
|---|---|---|---|---|
| 7,991,660 | B2* | 8/2011 | Brady | G06Q 40/00 |
| | | | | 705/1.1 |
| 8,626,619 | B2* | 1/2014 | Brady | G06Q 40/00 |
| | | | | 705/1.1 |
| 10,169,828 | B1* | 1/2019 | Morin | G06Q 40/123 |
| 2009/0030818 | A1* | 1/2009 | Braun | G06Q 40/06 |
| | | | | 705/30 |
| 2013/0144715 | A1* | 6/2013 | Kranzley | G06Q 30/0251 |
| | | | | 705/14.49 |
| 2013/0304558 | A1* | 11/2013 | Lange | G06Q 40/08 |
| | | | | 705/14.27 |
| 2016/0098804 | A1* | 4/2016 | Mascaro | G06Q 40/123 |
| | | | | 705/31 |
| 2016/0234322 | A1* | 8/2016 | Blackhurst | H04L 67/22 |

OTHER PUBLICATIONS

Rettig, "A Fresh Start for Struggling Taxpayers", Journal of Tax Practice & Procedure, Year: Jun.-Jul. 2011.*

* cited by examiner

IDENTIFYING AND RECOMMENDING POTENTIAL BENEFITS

RELATED APPLICATIONS

This non-provisional patent application claims priority benefit, with regard to all common subject matter, of earlier-filed U.S. Provisional Patent Application No. 62/380,100, filed Aug. 26, 2016, and entitled "IDENTIFYING AND RECOMMENDING POTENTIAL BENEFITS." The identified earlier-filed provisional patent application is hereby incorporated by reference in its entirety into the present application.

BACKGROUND

1. Field

Embodiments of the invention relate to benefits provided by employers and other entities. More specifically, embodiments of the invention relate to the identification and recommendation of potentially applicable benefits to a user.

2. Related Art

Tax returns and other financial data sources contain information about an individual and the benefits they are utilizing. There are often other benefits that the individual is not aware that they qualified to receive, such as employee benefits and government benefits. However, identification of the potential benefits is very difficult to perform. As such, many individuals are missing out on important benefits due to lack of awareness. An example of a benefit may be an employee benefit program offered by the individual's employer. While employers typically offer various benefits to employee, information related to these employer-provided benefit programs are often provided in rarely read employment manuals or not very well publicized. Therefore, many employees are unaware of certain benefits, and there exists no easy method of determining the benefits offered so as to recommend the benefit to the user. What is lacking in the prior art is a method of indirectly determining the offered benefits and provide a recommendation to the user to seek the benefits.

SUMMARY

Embodiments of the invention solve the above-mentioned problems by providing a system, a computerized method, and a computer program for identifying and recommending benefits to the user. The system considers benefits reported on multiple tax returns. Tax returns that include a common external entity (such as an employer of the taxpayer) are compared to determine trends in the benefits reported. From this analysis, potential benefits for which the user may be eligible are determined. The system may then recommend or provide information about these benefits to the user, so that the user may begin to receive the benefit. The system does this with little to no user actions being required.

Embodiments of the invention are directed to a non-transitory computer readable storage medium having a computer program stored thereon for identifying potential benefits for a subject taxpayer, wherein execution of the computer program by at least one processing element performs the following steps: receiving a set of taxpayer information related, at least in part, to a subject tax return of the subject taxpayer; identifying an external entity identified on the subject tax return; analyzing a filed return data store to determine benefits reported on tax returns that are indicative of the external entity; identifying a potential benefit associated with the external entity; determining an estimated criterion for the potential benefit; determining whether the subject taxpayer is likely eligible for the potential benefit, based upon the estimated criterion and the set of taxpayer information; and recommending the potential benefit to the subject taxpayer.

Other embodiments of the invention may be directed to a computerized method of determining whether an identified benefit may apply to a subject taxpayer, the method comprising the following steps: acquiring a set of tax information related to the subject taxpayer; analyzing a filed return data store to determine a potential benefit, determining an estimate criteria for the potential benefit; comparing the estimate criteria for the benefit to the set of tax information; determining a likelihood of qualification for the benefit based upon the estimate criteria; comparing the likelihood of qualification to a threshold; and presenting, to the user upon determining that the likelihood of qualification is above the threshold, a recommendation that the user claim the benefit.

Still other embodiments of the invention may be directed to a system comprising a user device and a server. The user device is configured to acquire a set of taxpayer information related, at least in part, to a subject tax return of the subject taxpayer. The server is configured to analyze a filed return data store to determine benefits reported on tax returns that are indicative of an external entity that is indicated in the set of taxpayer information; identify a potential benefit associated with the external entity; determine an estimated criterion for the potential benefit; and determine whether the subject taxpayer is likely eligible for the potential benefit, based upon the estimated criterion and the set of taxpayer information.

Still other embodiments of the invention may be directed to a computerized method of implementing the above-discussed steps. Still other embodiments of the invention may be directed to a system that comprises a server and a user device. The server is configured to receive information from the user device indicative of at least one external entity and then perform the discussed steps to determine if there are any benefits provided by the external entity for which the user may qualify.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
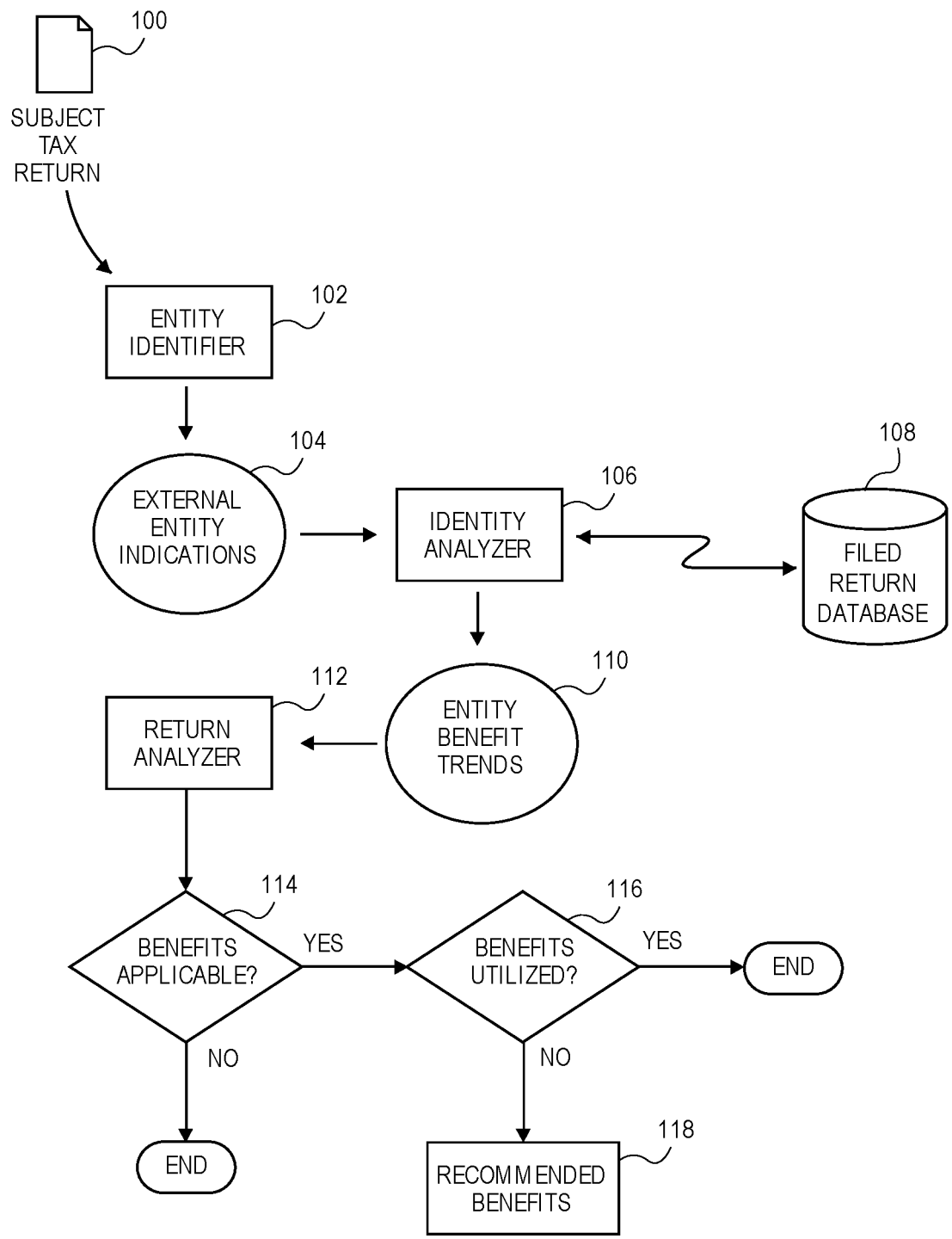
FIG. 1 is a flow diagram of an exemplary embodiment of the invention that identifies potential benefits and recommends these benefits to the user.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a method, and a system for identifying and recommending certain potential benefits to a user. An example of a benefit may be a program offered by an employer of the user. Employers typically offer various benefits to employees. However, it is difficult for an external entity, such as a tax return preparation service, a financial institution (such as for the granting of a loan), credit agencies, or the like, to determine what benefits are being offered by the employer. For example, a bank considering a loan application from an individual whose employer provides certain benefits may be a lower-risk. The bank need not necessarily know if the applicant participates in that benefit, but could be part of the application process itself or the bank could know to inquire. Embodiments of the invention therefore determine likely benefits offered by the employer, or other entity, determine whether it is likely that the user qualifies for these benefits, and recommends these benefits to the user upon that determination.

Turning to the figures, FIG. 1 presents an exemplary flow diagram illustrating various steps of embodiments of the invention. Generally, a subject tax return that is associated with a subject taxpayer is received, produced, or otherwise acquired for purposes of identifying the employer or other external entity whose benefits may be available to the taxpayer. External entities, such as employers, associated with the subject taxpayer are identified based upon an analysis of the subject tax return. Trends in benefits provided are analyzed for at least one external entity. The benefits are gleaned, estimated, or otherwise determined based upon other filed or prepared tax returns associated with other taxpayers (e.g., other than the subject taxpayer). The identified potential benefits are compared against the subject tax return to determine if the subject taxpayer is potentially entitled to the benefit and whether the subject taxpayer is currently utilizing the benefit. The benefit may then be recommended to the taxpayer for current and/or future claiming.

In Step 100, the subject tax return is received, accessed, generated, produced, or otherwise acquired. The subject tax return relates to the taxes of the subject taxpayer. In Step 100, a set of taxpayer information may additionally or alternatively be received. The set of taxpayer information may include additional known information about the subject taxpayer, such as account information, previous year tax returns, qualitative information, quantitative information, or other information known about the subject taxpayer.

Figure 2:
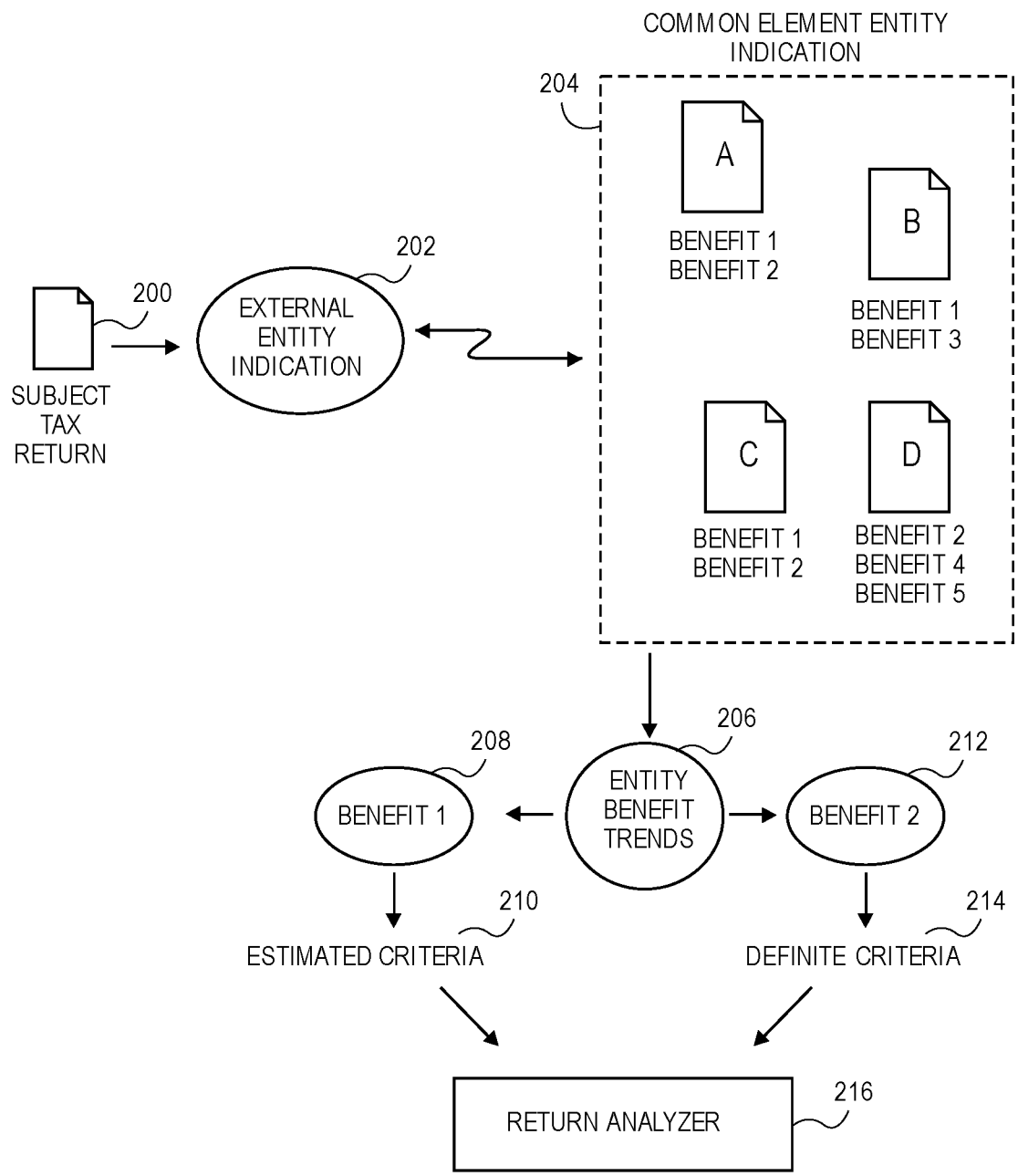
FIG. 2 is a flow diagram illustrating more detailed steps in identifying the potential benefits.

It should be appreciated that in other embodiments of the invention, the discussed steps may be performed prior to the submission or completion of the tax return. For example, the below discussed steps may be performed while the subject taxpayer or other user is providing information to a tax return preparation program. As a more specific example, upon the input of an employee identification number into the tax return preparation program at least some of the below discussed steps may be performed at that time (e.g., before the subject tax return is completed). The steps of identifying benefits provided by the external entity may be performed periodically for all or some of the tax returns that include a reference to the external entity. The results of these steps may be saved in an external entity profile (as shown in FIG. 2 and discussed below) or other accessible format.

The subject taxpayer may include any entity, either a legal or natural person, that files a tax return with a government taxing authority. The subject taxpayer may also be a married couple or other plurality of individuals filing a single tax return. Taxes to be paid can be United States Federal Income Tax, income tax for the various states within the United States, corporate taxes, partnership taxes, LLC taxes, property taxes, tariffs, or other taxes. Typically, the subject taxpayer provides information relevant to themselves and the amount of tax owed in the form of the tax return (based upon incomes, expenses, and the like). The tax return may therefore include information indicative of the employer and other external entities to which the subject taxpayer is or may be associated. The tax return may also include information indicative of various benefits that the subject taxpayer is utilizing (or has utilized during the tax year).

The computer program receives information about the subject taxpayer. In one embodiment, the subject taxpayer brings physical copies of his tax-related documents, such as W2s and 1099s, to the tax preparer. A tax preparer then enters information from the tax-related documents into a tax preparation computer program. In another embodiment, the subject taxpayer enters information from the tax-related documents into tax preparation software. The tax preparation computer program may be the same as or interface with the computer program of embodiments of the invention. In addition, the subject taxpayer answers questions related to his taxes, either verbally to the tax preparer or by inputting into the computer program.

The tax return is essentially a report filed with the appropriate government taxing authority, such as the Internal Revenue Service in the case of U.S. federal income tax.

Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the subject taxpayer or tax preparer calculates the taxes due. To assist in the calculation and to allow the taxing authority to verify the calculations, the tax return contains pertinent information associated with the subject taxpayer for the tax year. The tax return can be either written, digital, or a combination of both. In other embodiments, information relevant to the subject taxpayer and the tax to be paid are provided on other various forms and documents, such as a Form W2 or a Form 1099.

In embodiments of the invention, in Step 100 the system may also receive or otherwise acquire tax returns from previous years and/or relevant to other taxing authorities for the current and/or previous years, financial records, and bank statements. In some embodiments, all of the information is received by the computer program as a single set. In other embodiments, the computer program may query the user to input additional information. The subject taxpayer may also provide information to the system that the tax preparer does not have access to, such as financial records and bank statements.

In Step 102, various external entities are identified by an analysis of the tax return. As used herein, "external entity" refers to any corporation, organization, governing body, or person (legal or natural) that is indicated on the tax return, other than the subject taxpayer, family members of the subject taxpayer, and other dependents of the subject taxpayer or other individuals. In some instances, the external entity will have a relationship with the subject taxpayer. For example, the external entity may be the employer of the subject taxpayer. As another example, the external entity may be a government agency associated with the home address of the subject taxpayer. As yet another example, the external entity may be a non-profit organization that provides various benefits to the donors. As still another example, the external entity may be a university to which the subject taxpayer has paid tuition. As yet another example, the external entity may be a government agency that provides benefits to various people. In other embodiments, the external entity may have no relationship to the subject taxpayer. For example, the external entity may be a program or organization to which the taxpayer may be entitled to a benefit but which the taxpayer has not associated or claimed the benefit.

Therefore, as an exemplary implementation of Step 102, the system may identify an Employee Identification Number (EIN) that appears on the subject tax return. The EIN identifies the corporation or other organization that employs the subject taxpayer. It should be appreciated that in many instances the employer of the subject taxpayer may be the primary source of the potential benefits. However, the discussion below as to employer-based benefits is merely exemplary. Other benefits may be derived from other sources by external entities associated with tax return either directly (e.g., having a name, number, or other identifier appearing on the tax return) or indirectly (e.g., associated with locations on the subject tax return, associated with income levels on the subject tax return, related to average home values in the zip code of the subject taxpayer, or otherwise related to benefits to which the subject taxpayer may be entitled).

In Step 104, the identified external entity indications collected into, sent to, or retrieved by an identity analyzer.

It should be appreciated that often the subject tax return will contain external entity indications for multiple external entities. For example, the subject taxpayer may have more than one employer. As another example, the subject taxpayer may be a married couple, such that the first spouse has a first employer and the second spouse has a second employer. As yet another example, the subject taxpayer may be receiving benefits from multiple government agencies. In some embodiments of the invention, the identity analyzer may identify a set of external entities that has a certain similarity or association. For example, if a first external entity is identified, other related external entities may be retrieved and analyzed though not explicitly In Step 106, the identity analyzer determines benefits that are associated with the identified external entity indications. The identity analyzer searches for other tax returns (or related documents) that include the same or similar external entity indication. This may include, in Step 108, accessing a filed return database. The filed return database may include filed tax returns for the current year and for previous years (as the benefits offered by the external entity are unlikely to change substantially from year to year). The filed return database may also include other information about benefits provided by the various external entities.

The identity analyzer may access an entity information database (which may be included in or associated with the filed return database). The entity information database includes direct benefit information about the external entity. For example, the entity information database may include information from websites or other electronic resources associated with the external entity that is indicative of the benefits offered and any criteria associated with those benefits. The entity information database may also include information that has been determined or estimated about the benefits offered by the external entity through previous iterations of the discussed steps.

In embodiments of the invention, the filed return database and/or the entity information database may be located in a location associated with the tax professional, financial professional, the taxing authority, or other location such that it can be accessed. The filed return database and/or the entity information database may be periodically or occasionally updated as new information and analyses become available or are performed. The filed return database and/or the entity information database may remove or not accept private information so as to not violate privacy concerns of the users.

In Step 110, the identity analyzer determines entity benefit trends associated with each identified external entity. The trends are determined, at least in part, from analyzing other tax returns with a common external entity. The benefits that are offered by that external entity are therefore determined by determining similarly situated individuals that claimed the benefit. The system may also determine the criteria that likely accompany the benefit. For example, if only tax returns over a certain threshold income level are reporting the benefit, the system may determine that this threshold income level may be at least a partial criterion for the benefit. As such, the system can determine if the subject taxpayer is likely entitled to the same benefits, as discussed below. One method of determining potential benefits that are likely offered by the external entity are discussed below in relation to FIG. 2.

It should be appreciated that, like other steps discussed herein, Steps 106-110 may be performed in a different order than that previously discussed (e.g., before Steps 100-104). Steps 106-110 may be performed periodically independently of the other steps. For example, Steps 106-110 may be performed as new tax returns are being filed, created, or the like. This could include being performed daily, hourly, or the like. Steps 106-110 may also be performed on demand, such as upon the external entity indication being identified in Steps 102 and 104.

As used herein, "benefit" includes any type of monetary, non-monetary, service, or other benefit provided to a taxpayer that is indicated (at least partially or indirectly) on a tax return. Examples of these benefits, though far too extensive to list entirely, may include savings benefits, dependent care benefits, healthcare benefits, health savings accounts, flex spending accounts, stock purchase plans, reimbursements, or other monetary benefits. Other examples of these benefits include delayed payment options, debt forgiveness options, and other non-monetary benefits. Generally, a benefit may be any actionable or claimable item In Step 112, a return analyzer imports the subject tax return or otherwise acquires information related to the subject tax return. In addition to determining the benefits that are likely provided by the external entity (or are otherwise available to similarly situated taxpayers), the return analyzer determines whether the subject taxpayer is actually receiving and reporting the benefit. The return analyzer may also recommend various benefits before performing the below-discussed analysis. For example, the return analyzer may present information to the user indicative of identified entities and benefits before or independent of the below-discussed steps.

In Step 114, the return analyzer determines whether the subject taxpayer is likely entitled to receive the benefit, based upon the determined criteria, and other similarities between the subject taxpayer and the taxpayers of the other tax returns from the filed return data store. Determining that the subject taxpayer is likely entitled to receive the benefit may include a likelihood percentage or other quantifiable representation that the subject taxpayer is in fact eligible. The return analyzer may additionally request information from the user in making this determination and for assisting future iterations of the process. For example, if a certain benefit is only available to employees at the external entity with a certain job title or that have been employed there for a certain amount of time, the return analyzer may request such information from the user.

In Step 116, the return analyzer determines whether the benefit has been utilized by the subject taxpayer, as indicated on the subject tax return. The return analyzer may also determine whether the subject taxpayer could gain from utilizing the benefit. For example, childcare benefits are of no gain to taxpayers that have no children. It is also possible that the user is already utilizing the benefit but has failed or forgotten to claim such on the subject tax return. Embodiments of the invention may therefore assist the user in claiming the utilized benefits so as to correct report their tax liability. It should also be noted that some benefits may be presently claimable by the subject taxpayer and some benefits may be able to be utilized in the future.

If the subject taxpayer is likely eligible for the benefit and is not utilizing the benefit, in Step 118 the system may recommend that the subject taxpayer utilize the benefit. This recommendation could be done in any of numerous ways. For example, the system may present to the user a message such as "Our records indicate that other similar employees at your employer are utilizing employer-provided retirement savings plans. We recommend that you consider looking into these plans." As another example, the message may say "At your current income level and having a dependent child over 14 years of age, please consider an employer-matched 529 plan." Still another exemplary message could be "Our records indicate that you would likely save money by buying a home in your area instead of renting, because of the government-offered mortgage interest deduction. You may consider buying a house in the next year to take advantage of this benefit." Yet another example message could be "Our records indicate that the health insurance provided by your wife's employer is superior to the health insurance provided by your employer. We therefore recommend that you consider both switching to the health insurance provide by your wife's employer instead of having separate insurance plans."

The system may also provide additional information to the user about the specific benefits provided, any known or estimated criteria for the benefit, how the benefit can provide a gain to the subject taxpayer, and other relevant information to help the subject taxpayer determine whether and how to pursue the benefit. The message may also allow the user to indicate that the subject taxpayer is in fact already receiving the benefit. The user may then enter information indicative of the benefit being received. In this way, in addition to helping the subject taxpayer receive all earned benefits, the system can provide error checking in the preparation of the tax return.

In embodiments of the invention, the invention is utilized by a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing at least a portion of the set of taxpayer information, the external entity profile (shown in FIG. 2), and other relevant information.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help bolster the legitimacy of the clients' tax returns.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a taxing authority. The taxing authority (also known as a revenue service or revenue agency) is a government entity or an entity associated with a government body. The taxing authority has, through prescribed legal authority, the power to assess, levy, and collect taxes. The taxing authority may also have the power to collect other non-tax-related revenue, such as penalties and interest. The taxing authority may perform secondary functions, such as investigating and charging tax fraud, performing audits, etc. The taxing authority can be at any level of government: international, federal, state, county, and city. Examples of taxing authorities include the IRS, the Missouri Department of Revenue, etc. The taxing authority may be motivated to utilize the invention to provide maximum benefits to the taxpayers, thereby encouraging electronic filing which is easier and cheaper to receive than paper tax returns. Further, the invention may be useful to a taxing authority to take a survey of incoming tax returns to determine what benefits are being offered and utilized.

Turning to FIG. 2, a more detailed depiction of the steps of determining the potential benefits that are provided by the external entity. In some embodiments of the invention, the system will generate an external entity profile. The external entity profile gives an indication of the standard benefits that the external entity provides to its employees, customers, constituents, or other people. In some embodiments of the invention, the external entity profile can be displayed to or otherwise accessible by the user.

In Step 200, the subject tax return (or a partially completed portion thereof) is analyzed. In Step 202, external entity indications are identified from the subject tax return, as discussed above. Step 204 is performed for each external entity indicated. As discussed above, the performance of Steps 204 and after may be performed independently of Step 200 and 202 (and the corresponding steps of FIG. 1).

In some embodiments, other analogous external entities may be utilized to populate the common external entity indication field as illustrated in FIG. 2. For some external entities, such as large corporations, the field may include thousands or even millions of tax returns. For other external entities, such as small companies and organizations, the field may only include a few tax returns. Therefore, in order to generate a field sufficiently large for an analysis, other analogous external entities may be added to the field for analysis. For example, a small medical clinic may only employ a handful of employees. While the small number of employees would make a benefit analysis difficult, the system may consider other small medical clinics (either directly, by directly populating tax returns from these other medical clinics for analysis, or indirectly, by incorporating observed trends from the other medical clinics). The similarities may be ranked or otherwise quantified so as to aid in the analysis.

FIG. 2 illustrates an exemplary single external entity and the related tax returns, shown as Step 204. The single external entity of this example includes tax return A, tax return B, tax return C, and tax return D. Tax return A indicates benefit 1 and benefit 2. Tax return B indicates benefit 1 and benefit 3. Tax return C indicates benefit 1 and benefit 2. Tax return D indicates benefit 2, benefit 4, and benefit 5. It should be appreciated that the discussed tax returns and benefits are only for purposes of illustrating concepts to the reader, and are merely exemplary.

In Step 206, entity benefit trends are identified by a statistical analyzer. Broadly speaking, the statistical analyzer determines correlations and commonalities between tax data items within each data set (e.g., each tax return or the like). For example, it may be the case in one data set that taxpayers who report rental income are highly likely to take an itemized deduction for mortgage interest. As used herein, a "trend" within a data set is any predictive association between two or more tax data items in the data set. The "trend" may be a determined with respect to changes over time, or a pattern or probabilistic associated that is not dependent on time. Alternatively, the statistical analyzer may determine absolute or conditional take rates for certain benefits within each data set. For example, the employer-backed retirement savings may be present in 25% of the tax returns present. Such single-item trends are also contemplated as being with the scope of the invention.

The statistical analyzer may use any statistical techniques, now known or later developed, to identify a set of benefit trends within the common external entity indication field (illustrated in Step 204). For example, pairwise correlations may be calculated across all tax data items in a set of tax returns. In some embodiments, multiple regressions may also be used to identify correlated triples or n-tuples. In other embodiments, neural-network based techniques such as Restricted Boltzmann Machines can be used to identify trends within the sets of tax returns. In still other embodiments, matrix-based techniques such as SVD++ can be used to identify trends. One of skill in the art will appreciate that there are a variety of other statistical and machine-learning techniques that can be used to determine sets of benefit trends. However, it is significant to note that a set of trends within a data set may not be used to identify errors within that data set, because the errors are may be present in the data set. As such, machine learning techniques may identify these errors as being normal.

In Step 208 and 212, the individual benefits that were identified are further analyzed. In Step 210, estimated criteria are determined. Estimated criteria are those that are calculated based upon common factors in the tax returns that report the benefit (as well as common factors in tax returns that do not report the benefit). For example, the system may determine that certain benefits are reported on tax returns over a certain income level. As another example, the system may determine that certain benefits are reported on tax returns in which the taxpayer has worked for that employer for an entire year.

In Step 214, definite criteria may be determined for the benefit. Definite criteria is directly indicative of the criteria for the benefit. Definite criteria may be entered manually for a certain benefit, may be disclosed internally to the tax return or related document, or may be disclosed externally to the tax return (such as on a website associated with the external entity). For example, criteria for a federal benefits program may be officially published in a federal register or tax regulation. Other definitive criteria may be officially published by the external entity, or may be standardized for all external entities in a given field or association.

In Step 216, the benefit information, the estimated criteria, and the definite criteria are assembled into an external entity profile. The external entity profile gives an indication of the standard benefits that the external entity provides to its employees, customers, constituents, or other people. In some instances, both the estimated criteria and the definite criteria are utilized in determining whether the subject taxpayer is likely eligible to receive the benefits (as discussed above in Step 114). Additionally or alternatively, the system may present information to the user indicative of how to claim or otherwise take advantage of the benefit. The system may also present information indicative of a likelihood that certain benefits may become available in the future.

Figure 3:
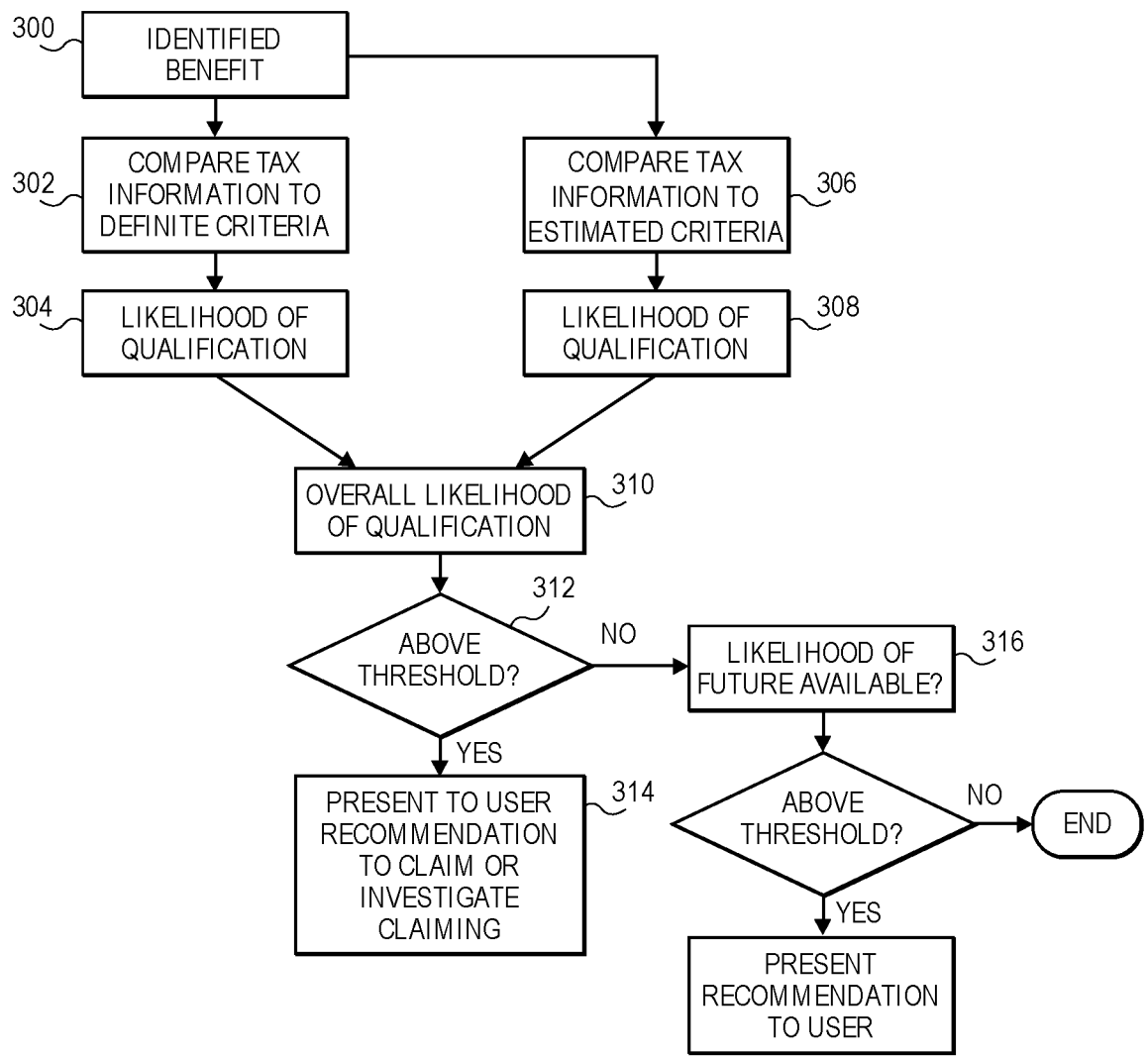
FIG. 3 is a flow diagram illustrating more detailed steps in determining the applicability and qualification for the identified potential benefits.

Turning to FIG. 3, a flow diagram is illustrated showing detailed steps in determining the applicability and qualification for the identified potential benefits. As discussed above, various benefits may be identified through various processes. Some of the identified benefits may not be applicable to the subject taxpayer for various reasons. For example, the benefit may require a criterion that the taxpayer does not meet. As another example, the benefit may have required a prior action to claim which the subject taxpayer did not take. As yet another example, the benefit may only be proactively available, such that the system may inform the subject taxpayer of the benefit though it is not presently claimable. The system therefore determines which, if any, of the identified benefits should be recommended to the user for current or future claiming.

In Step 300, the identified benefits are determined, received, or otherwise acquired. The identified benefits may be associated with the external entities that were identified above, associated with other similar subject taxpayers regardless of external entity, identified with a standard set of generally applicable benefits, or otherwise proposed as possible benefits that may be applicable to the subject taxpayer. It should be noted that each of the below-discussed steps may be performed for each of the identified benefits. In some embodiments of the invention, each step may be performed for all or some identified benefits in a batch before moving onto the next step. In other embodiments, a single benefit may be analyzed through all or some of the steps individually.

In Step 302, definite criteria for the benefit, if any is known, is compared to the tax information. As discussed above, definite criteria are clearly and/or officially designated qualification criteria. This qualification criteria are then compared to the tax information that is being gathered from or has been gathered from the user about the subject taxpayer. The system may also further inquire to the user for information to determine whether the subject taxpayer meets the qualification criteria.

In Step 304, the system determines a likelihood of qualification. The likelihood of qualification for the definite criteria may be an expression of the likelihood that the subject taxpayer meets the definite criteria. The likelihood of qualification may be a binary true/false expression if the information necessary to determine qualification is definitively known. For example, if a person must be under a certain income threshold to qualify for the benefit, and the subject taxpayer's income is over that threshold, the system may determine that the subject taxpayer does not qualify. As another example, if a person must have worked full-time for a certain employer for three years to qualify for a benefit, and the system has access to tax returns for three previous years which are indicative of the employer being employed for each year, but are not indicative of whether the employee is full-time or whether the employee has had any breaks in employment, the system may determine a percentage chance (or other quantitative figure) that the subject taxpayer is actually qualified for the benefit, which may be based upon a comparison to other tax returns, other statistical information, or bare mathematical probabilities.

In Step 306, estimated criteria for the benefit, if any is known, is compared to the tax information. As discussed above, estimated criteria is determined or estimate qualification criteria based upon an analysis of other tax returns that claim the benefit. The qualification criteria are then compared to the tax information that is being gathered from or has been gathered from the user about the subject taxpayer. The system may also further inquire to the user for information to determine whether the subject taxpayer meets the qualification criteria.

In Step 308, the system determines a likelihood of qualification based upon the estimated criteria. The likelihood of qualification for the estimated criteria may be an expression of the likelihood that the subject taxpayer meets the estimated criteria. The likelihood of qualification may be a binary true/false expression if the information necessary to determine qualification is definitively known and the estimated criteria has an associated high level of certainty that the estimated criteria is correct. For example, if in previous iterations of the steps for the benefit for this external entity, recommendations that the benefit may apply to the previous subject taxpayers were all or mostly found to be correct, the system may increase the likelihood that future iterations are being correctly identified as being likely qualified for the benefit.

In Step 310, the system determines an overall likelihood of qualification of the subject taxpayer for the specific benefit. The overall likelihood may be based upon the likelihood of qualification based upon the definite criteria, the likelihood of qualification based upon the estimated criteria, or a combination of both. For example, if the likelihood of qualification is above a high threshold or below a low threshold in Step 304, the overall likelihood of qualification may be above the same high threshold or below the same low threshold. Similarly, if the likelihood of qualification from Step 304 is binary, Steps 306 and 308 may be bypassed or otherwise not completed. If both likelihoods of qualification exist and are non-binary (e.g., they both include a percentage chance), the overall likelihood of qualification may be a pure average or a weighted average of the two respective likelihoods. The weighted averages may include relative certainty that the likelihood is correct, a cumulative effect of the two respective certainties, the outcome of previous iterations for this or other subject taxpayers, and other considerations in determining an overall likelihood that the subject taxpayer is eligible for the benefit.

In Step 312, the system determines whether the overall likelihood of qualification is above a certain threshold to warrant further consideration and presentation to the user. The threshold may be predetermined based upon that specific benefit, predetermined for all benefits, variable based upon the other criteria considered, variable based upon user preference, or may be determined or variable based upon other criteria. The threshold is the degree of certainty over which the system is sure enough that the subject taxpayer may be eligible for the benefit so as to warrant presenting the benefit to the user as either a current or future benefit for the user's consideration.

If the overall likelihood of qualification is over the threshold, in Step 314 the system may present to the user recommendations to claim the benefit or investigate claiming the benefit. This may include general information about the benefit, the estimated and/or definite criteria about the benefit, why the benefit is being recommended, the determined overall likelihood of qualification, and other information that may make the user aware of whether or not they qualify for the benefit and how to go about claiming the benefit. It should be noted that "claiming" the benefit can include claiming it on the tax return and/or actually receiving the benefit.

If the overall likelihood of qualification is under the threshold, in Step 316 the system determines whether there is a likelihood of future availability for the benefit. For example, if the subject taxpayer has been steadily increasing in income each year and is near a threshold income to qualify for a certain benefit, the benefit may be a future availability for the subject taxpayer. The system may therefore provide information to the user that is associated with general information for the benefit, such that the user is aware of the benefit with future availability so that the benefit may be utilized as soon as possible. This consideration may include a secondary threshold and, if the likelihood of future availability is above the secondary threshold, presenting a recommendation to the user to take advantage of the benefit when it becomes available.

Figure 4:
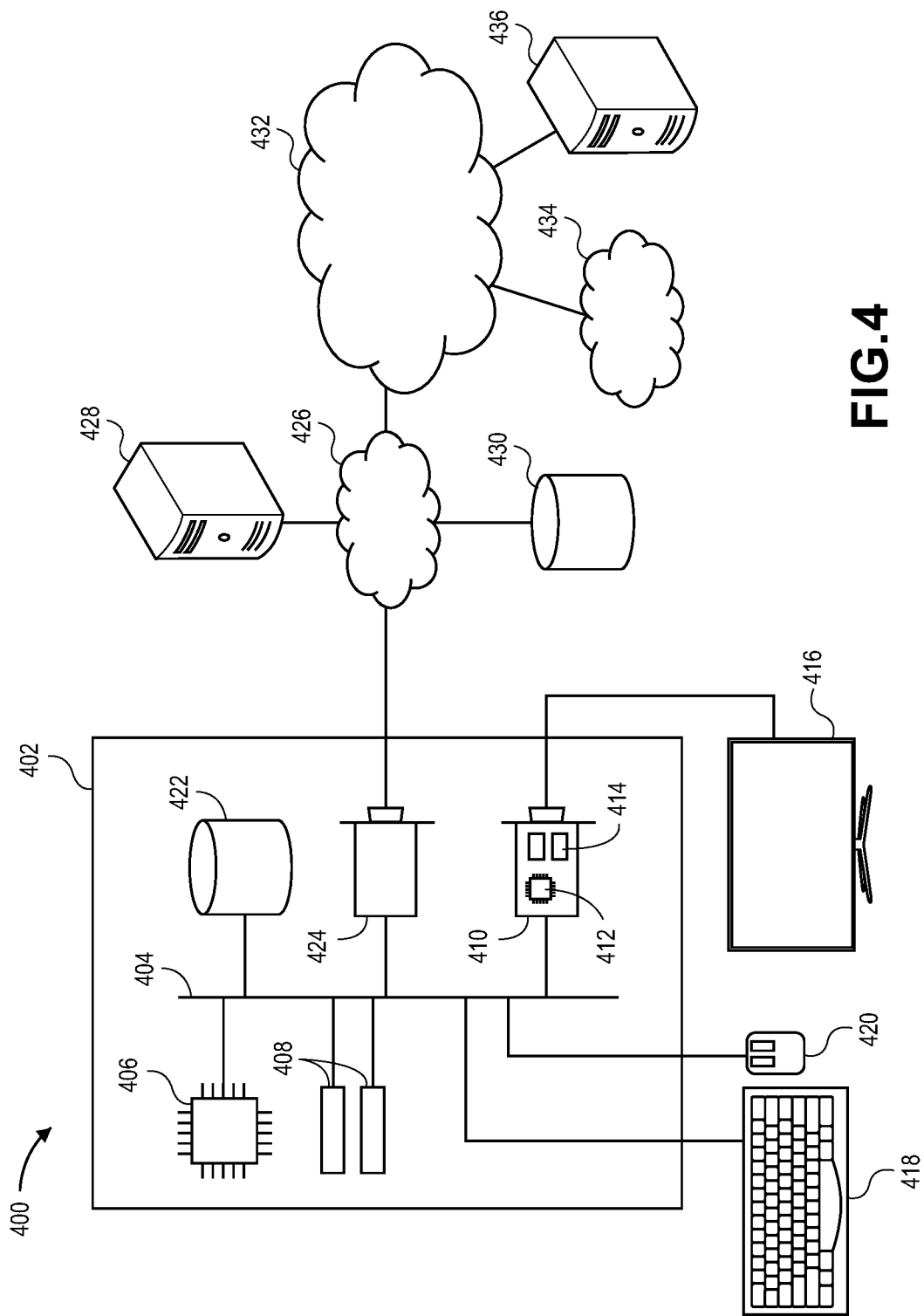
FIG. 4 is a system diagram of an embodiment of the invention depicting various computing devices and their components.

Turning to FIG. 4, the specific components of the system 400 will now be discussed. An exemplary hardware platform for certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 432. Local network 426 is in turn connected to Internet 432, which connects many networks such as local network 426, remote network 434 or directly attached computers such as computer 436. In some embodiments, computer 402 can itself be directly connected to Internet 432.

The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-alone computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the subject taxpayer may be provided with a taxpayer account that permits the subject taxpayer to access embodiments of the invention that are applicable to preparing a tax return. Additionally, the external entity may be provided with an external entity account that permits the external entity to access embodiments of the invention that are applicable to reporting benefit offerings and criteria. Additionally, the tax preparer may be provided with a tax preparer account, through which he can monitor the benefits offered and recommend benefits to the subject taxpayer. In addition, any number and/or any specific types of account are provided to carry out the functions, features, and/or implementations of the invention. Upon the subject taxpayer, external entity, and/or tax preparer logging in to the electronic resource for a first time, they may be required to provide various pieces of identification information to create their respective accounts. Such identification information may include, for instance, personal name, business name, email address, phone number, or the like. Upon providing the identification information, the subject taxpayer, external entity, and/or tax preparer may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium having a computer program stored thereon for identifying potential benefits for a subject taxpayer, wherein execution of the computer program by a computer system having one or more processing elements performing the following steps:
   receiving, by at least one of said processing elements, a set of taxpayer information related, at least in part, to a subject tax return of the subject taxpayer;
   identifying, by at least one of said processing elements, an external entity identified on the subject tax return;
   analyzing, by at least one of said processing elements, filed tax returns from a plurality of taxpayers within a filed return data store to determine benefits reported on the filed tax returns that are indicative of the external entity,
   identifying, by at least one of said processing elements, a potential benefit for the subject tax return based at least in part on the filed tax returns;
   determining, by at least one of said processing elements, an estimated criterion for the potential benefit;
   determining, by at least one of said processing elements, whether the subject taxpayer is likely eligible for the potential benefit, based upon the estimated criterion and the set of taxpayer information; and
   presenting, via a graphical user interface, a recommendation that the subject taxpayer utilize the potential benefit.

2. The non-transitory computer readable storage medium of claim 1, wherein the external entity is an employer of the subject taxpayer and the potential benefit is a monetary benefit provided by the employer to employees.

3. The non-transitory computer readable storage medium of claim 1, further comprising the following steps:
   determining a definite criterion for the potential benefit, wherein the definite criterion is based at least in part on a rule of eligibility for the potential benefit; and
   determining whether the subject taxpayer is likely eligible for the potential benefit, based upon the definite criterion and the set of taxpayer information.

4. The non-transitory computer readable storage medium of claim 3, wherein determining the definite criterion is performed by retrieving benefit information from an electronic resource that is associated with the external entity.

5. The non-transitory computer readable storage medium of claim 1, wherein the estimated criterion is based at least in part on said determined benefits indicated on said tax returns in the filed return data store.

6. The non-transitory computer readable storage medium of claim 1, further comprising the following step:
analyzing the set of taxpayer information to determine whether the subject taxpayer is receiving the potential benefit.

7. The non-transitory computer readable storage medium of claim 1, further comprising the following step:
generating an external entity profile based upon at least one potential benefit associated with the external entity and the estimated criterion.

8. The non-transitory computer readable storage medium of claim 1, further comprising the following step:
updating the subject tax return based on the recommendation if the subject taxpayer confirms receiving the potential benefit.

9. A computerized method of determining whether an identified benefit may apply to a subject taxpayer performed by a computer system having one or more processing elements, the method comprising the following steps:
acquiring, by at least one of said processing elements, a set of tax information related to the subject taxpayer;
analyzing, by at least one of said processing elements, filed tax returns from a plurality of taxpayers within a filed return data store to determine a potential benefit for the subject tax return based at least in part on the filed tax returns,
determining, by at least one of said processing elements, an estimated criteria for the potential benefit;
comparing, by the at least one processing element, the estimated criteria for the benefit to the set of tax information;
determining, by at least one of said processing elements, a likelihood of qualification for the benefit based upon the estimate criteria;
comparing, by at least one of said processing elements, the likelihood of qualification to a threshold; and
presenting, to the subject taxpayer via a graphical user interface, upon determining that the likelihood of qualification is above the threshold, a recommendation that the subject taxpayer claim the benefit.

10. The computerized method of claim 9, wherein the determined potential benefit is being utilized by at least one filed tax return of the filed return data store.

11. The computerized method of claim 9, wherein the threshold is variable based at least in part on a user preference.

12. The computerized method of claim 9, wherein the estimated criteria is based at least in part on a common characteristic shared by at least two filed tax returns of the filed return data store.

13. The computerized method of claim 9, further comprising the following steps:
determining, by at least one of said processing elements, a definite criterion for the potential benefit,
wherein the definite criterion is based at least in part on a rule of eligibility for the potential benefit; and
determining, by at least one of said processing elements, whether the subject taxpayer is likely eligible for the potential benefit, based upon the definite criterion and the set of taxpayer information.

14. The computerized method of claim 13, wherein determining the definite criterion is performed by retrieving benefit information from an electronic resource that is associated with the external entity.

15. The computerized method of claim 13, further comprising the following step:
determining, by at least one of said processing elements, a likelihood of qualification for the benefit based upon the definite criteria,
wherein said step of comparing the likelihood of qualification to a threshold is based at least in part on the likelihood of qualification based upon the definite criteria.

* * * * *